United States Patent
Miyata

(10) Patent No.: US 7,539,405 B2
(45) Date of Patent: May 26, 2009

(54) IMAGE PICKUP APPARATUS WITH AUTOFOCUS FUNCTION

(75) Inventor: Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 418 days.

(21) Appl. No.: 11/304,970

(22) Filed: Dec. 14, 2005

(65) Prior Publication Data
US 2006/0133791 A1 Jun. 22, 2006

(30) Foreign Application Priority Data
Dec. 20, 2004 (JP) ............... 2004-366952

(51) Int. Cl.
*G03B 13/36* (2006.01)
(52) U.S. Cl. ............... 396/79; 396/88; 396/103; 396/147; 348/346; 348/347
(58) Field of Classification Search ............. 396/79–83, 396/88, 103, 127, 133, 147; 348/345–347, 348/349, 353–356
See application file for complete search history.

(56) References Cited

U.S. PATENT DOCUMENTS

| RE33,830 E * | 2/1992 | Hanma et al. ............... 348/354 |
| 6,970,646 B2 * | 11/2005 | Hirai ............................. 396/91 |
| 2006/0029381 A1* | 2/2006 | Onozawa ..................... 396/147 |

FOREIGN PATENT DOCUMENTS

| JP | 2000-147368 A | 5/2000 |
| JP | 2003-241069 A | 8/2003 |
| JP | 2003-262786 A | 9/2003 |

* cited by examiner

*Primary Examiner*—W. B. Perkey
(74) *Attorney, Agent, or Firm*—Frishauf, Holtz, Goodman & Chick, P.C.

(57) ABSTRACT

An image pickup apparatus comprises a setting unit which arbitrarily sets different auto focus search ranges, a selection unit which selects a desired auto focus search range from said different auto focus search ranges arbitrarily set by the setting unit, and an auto focus control unit which performs an auto focus operation based on the desired auto focus search range selected by the selection unit.

18 Claims, 11 Drawing Sheets

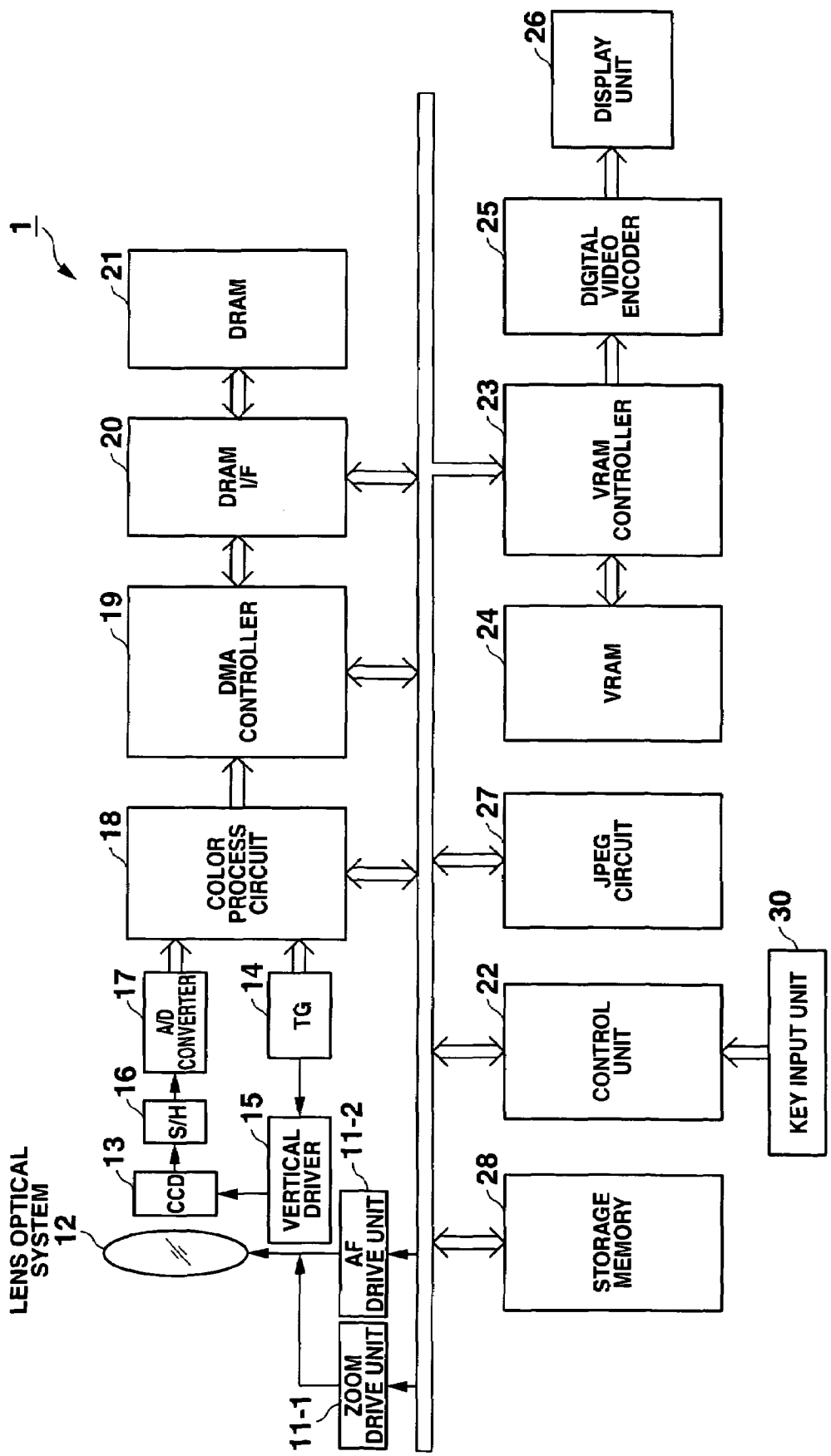

IMAGE PICKUP APPARATUS WITH AUTOFOCUS FUNCTION

CROSS-REFERENCE TO RELATED APPLICATIONS

This application is based upon and claims the benefit of priority from prior Japanese Patent Application No. 2004-366952, filed Dec. 20, 2004, the entire contents of which are incorporated herein by reference.

BACKGROUND OF THE INVENTION

1. Field of the Invention

The present invention relates to an image pickup apparatus with auto focus function which can be used for a digital camera, and an auto focus method.

2. Description of the Related Art

Currently, in the digital camera, a contrast type having no focus detection dedicated element structure is mainly used as the auto focus system.

In the contrast type of the auto focus system, the focus is detected based on the contrast of the image captured by CCD (Charge Coupled Device) which is of the image pickup device, and a point (focus lens position) where a value of the contrast of the image becomes the maximum is set at a focusing point.

Accordingly, in order to obtain the focusing point, it is necessary that contrast data is obtained at each distance by moving a focus lens to perform a drive scanning in an AF search range from the shortest distance to infinity. However, when the drive scanning is performed in the AF search range from the shortest distance to the infinity, there is a problem that a long time is required for the focusing operation (namely, the number of switching steps of a stepper motor moving the focus lens is increased).

Therefore, in some conventional digital cameras, a focusing range from the shortest distance to the infinity is previously divided into a close photograph movement range and a normal photograph movement range. When an operator selects one of photograph modes (macro photograph mode for close photograph and normal photograph mode for normal photograph), the focus lens is first moved within a movement range corresponding to the selected photograph mode. When the focusing point cannot be detected within the movement range corresponding to the selected photograph mode, the focusing point is detected within the other movement range, thereby shortening the time required for an auto focus operation by moving the focus lens.

In another conventional image pickup apparatus, when an object position is located in a macro region (close photograph AF search range) in the normal photograph mode, or when the object position is located in a normal region (normal photograph AF search range) in the macro photograph mode, the operator is encouraged to perform switch to the proper photograph mode by a warning message, or the switch to the photograph mode is automatically performed.

Further, there is an automatic focusing technology including means for selecting one of the normal photograph mode and the macro photograph mode and means for determining whether or not the object can be focused in the AF search range of the selected mode. In the automatic focusing technology, when the means determined that the object cannot be focused, the AF search range of the other mode is specified to perform focusing control.

BRIEF SUMMARY OF THE INVENTION

According to an embodiment of the present invention, an image pickup apparatus comprises:
a setting unit which arbitrarily sets different auto focus search ranges;
a selection unit which selects a desired auto focus search range from said different auto focus search ranges arbitrarily set by the setting unit; and
an auto focus control unit which performs an auto focus operation based on the desired auto focus search range selected by the selection unit.

According to another embodiment of the present invention, an image pickup apparatus comprises:
means for arbitrarily setting different auto focus search ranges;
means for selecting a desired auto focus search range from said different auto focus search ranges arbitrarily set by the setting means; and
means for performing an auto focus operation based on the desired auto focus search range selected by the selecting means.

According to another embodiment of the present invention, an image pickup method comprises:
arbitrarily setting different auto focus search ranges;
selecting a desired auto focus search range from said arbitrarily set different auto focus search ranges; and
performing an auto focus operation based on the selected desired auto focus search range.

According to another embodiment of the present invention, an article of manufacture comprises a computer usable medium having computer readable program code means embodied therein, the computer readable program code means comprises:
computer readable program code means for causing a computer to arbitrarily set different auto focus search ranges;
computer readable program code means for causing a computer to select a desired auto focus search range from said arbitrarily set different auto focus search ranges; and
computer readable program code means for causing a computer to perform an auto focus operation based on the selected desired auto focus search range.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is a view showing an example of an electronic circuit configuration of the digital camera shown in FIGS. 1A to 1C;

DETAILED DESCRIPTION OF THE INVENTION

An embodiment of a digital camera according to the present invention will now be described with reference to the accompanying drawings.

FIRST EMBODIMENT

Figure 1A:
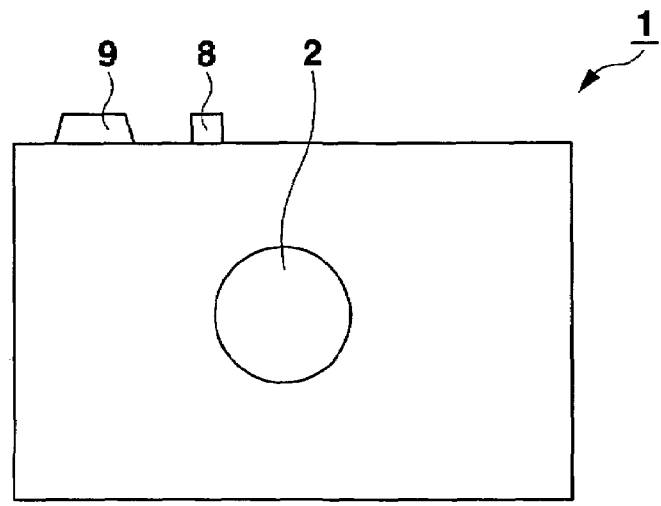
FIGS. 1A, 1B, and 1C are a view showing an appearance of a digital camera according to an embodiment of the invention.
Figure 1B:
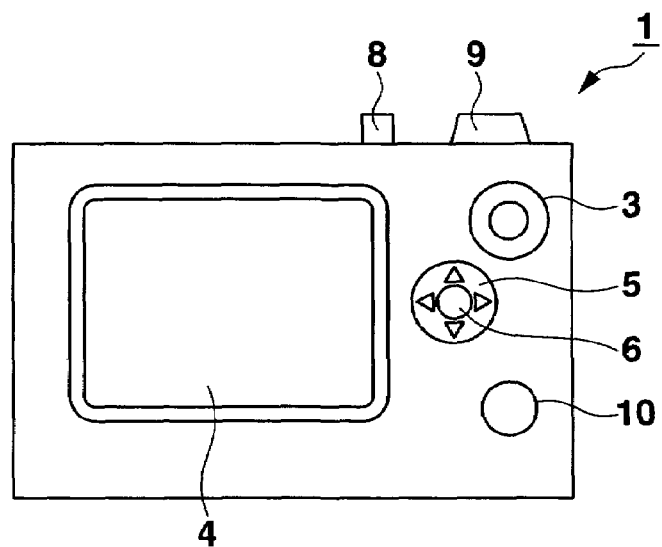
Figure 1C:
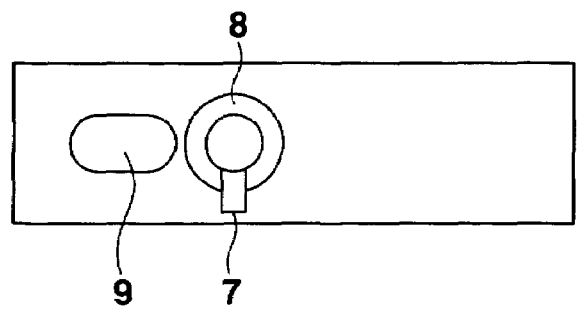

FIG. 1 is a view showing an appearance of an example of a digital camera which is of an electronic camera according to the invention, FIG. 1A is a front view, FIG. 1B is a rear view, and FIG. 1C is a top view.

As shown in FIG. 1A, a digital camera 1 has an imaging lens 2 on a front surface side. As shown in FIG. 1B, a mode dial 3, a liquid crystal monitor screen 4, a cursor key 5, a set key 6, a menu key 10, and the like are provided in a rear side of the digital camera 1. As shown in FIG. 1C, a zoom lever 7, a shutter key 8, and a power button 9 are provided in a top surface. A USB terminal connector (not shown) is provided in a side portion. The USB terminal connector is used in order to connect the digital camera 1 to an external device such as a personal computer and a modem through a USB cable.

FIG. 2 is a view showing an example of an electronic circuit configuration of the digital camera shown in FIGS. 1A to 1C. The digital camera 1 includes a zoom drive unit 11-1, an AF drive unit 11-2, a lens optical system 12, a CCD 13, a timing generator (TG) 14, a vertical driver 15, a sample hold circuit (S/H) 16, an A/D converter 17, a color process circuit 18, a DMA (Direct Memory Access) controller 19, a DRAM interface (I/F) 20, a DRAM 21, a control unit 22, a VRAM controller 23, a VRAM 24, a digital video encoder 25, a display unit 26, a JPEG circuit 27, a storage memory 28, and a key input unit 30. The zoom drive unit 11-1 to the color process circuit 18 correspond to the image pickup unit in the invention. The key input unit 30 includes keys 1 to 10 in FIG. 1.

In a monitoring state in the photograph mode, the zoom drive unit 11-1 drives a zoom lens drive motor (not shown) to move the zoom lens, and the AF drive unit 11-2 drives a focus lens drive motor (not shown) to move the focus lens to a focusing point or to vary the iris of the focus lens. The CCD 13 is the image pickup device arranged at the back of an imaging optical axis of the optical system 12 constituting the imaging lens 2. The CCD 13 is scan-driven by the timing generator (TG) 14 and the vertical driver 15 to output photoelectric conversion output of one frame corresponding to an optical image focused in each constant period.

The CCD 13 is a solid-state image pickup device which captures a two-dimensional image of an object, and typically the CCD 13 captures the tens frame images per second. The image pickup device is not limited to a CCD, but other solid-state image pickup devices such as CMOS (Complementary Metal Oxide Semiconductor) may be used as the image pickup device.

After a gain of the photoelectric conversion output is appropriately adjusted in each component of RGB primary colors while being in the state of an analog-value signal, the sample hold circuit (S/H) 16 performs sample and hold operations of the photoelectric conversion output. Then, the A/D converter 17 converts the photoelectric conversion output into digital data, the color process circuit 18 performs a color-process processing including an image interpolation process and a gamma correction process to generate a luminance signal Y and color-difference signals Cb and Cr having digital values. In the normal photograph mode, the color process circuit 18 outputs the luminance signal Y and the color-difference signals Cb and Cr to the DMA (Direct Memory Access) controller 19.

In the normal photograph mode, the DMA controller 19 performs DMA transmission of the luminance signal Y and the color-difference signals Cb and Cr to DRAM 21 through the DRAM interface (I/F) 20 using a composite synchronous signal, a memory write enable signal, and a clock signal which are output from the color process circuit 18.

The control unit 22 performs control operation of the whole of the digital camera 1. The control unit 22 includes CPU or MPU (hereinafter both of CPU and MPU are commonly abbreviated to as CPU), a program storage memory such as a flash memory, and RAM. Operation programs including the later-mentioned focusing range (AF search range) setting process in a recording mode are executed by the CPU, and the operation programs are stored in the program storage memory. The RAM is used as a working memory. After the DMA transmission of the luminance signal and the color-difference signals to the DRAM 21 is performed, the control unit 22 reads the luminance signal and the color-difference signals from the DRAM 21 through the DRAM interface 20, and the control unit 22 writes the luminance signal and the color-difference signals in the VRAM 24 through the VRAM controller 23.

According to a state signal from the key input unit 30, the control unit 22 takes out a process program and menu data corresponding to each mode. The process program and menu data are stored in the program storage memory such as the flash memory. The control unit 22 controls the performances of other functions of the digital camera 1 such as the auto focusing, the photographing, and the recording in the set focusing range. In addition, the control unit 22 controls the performances of reproduction and display of the image, and the control unit 22 performs the display control of a function selection menu in function selection and the display control of a setting screen.

The digital video encoder 25 periodically reads the luminance signal and the color-difference signals from the VRAM 24 through the VRAM controller 23, the digital video encoder 25 generates a video signal based on the pieces of data of the luminance signal and the color-difference signals, and the digital video encoder 25 outputs the video signal to the display unit 26.

As described above, the display unit 26 functions as the monitor display unit (electronic view finder) in the photograph mode. The display unit 26 performs the display based on the video signal from the digital video encoder 25. Therefore, the display unit 26 displays the image, based on image information captured from the VRAM controller 23 at that time, on the liquid crystal monitor screen 4 in real time.

When a focusing instruction (half-press of the shutter key 8 in the first embodiment) is given, the control unit 22 transmits a drive control signal to the AF drive unit 11 to perform auto focusing (AF) operation by moving the auto focus lens of the lens optical system 12 within the set focusing range. When a photograph instruction is given (full-press of the shutter key 8 in the first embodiment), the control unit 22 perform an image pickup operation. That is, after the DMA transmission of the luminance signal and the color-difference signals of one frame output from the CCD 13 at that time to the DRAM 21 is performed, a path from the CCD 13 to the DRAM 21 is immediately disconnected, and transition to a recording and storage state is taken place.

In the recording and storage state, the control unit 22 reads the luminance signal and the color-difference signals of one frame written in the DRAM 21 in a unit called basic block in each component of Y, Cb, and Cr through the DRAM interface 20. The basic block has eight pixels in a longitudinal direction by eight pixels in a crosswise direction. Then, the control unit 22 writes the luminance signal and the color-difference signals in the JPEG (Joint Photograph cording Experts Group) circuit 27, and the JPEG circuit 27 performs data compression of the luminance signal and the color-difference signals by a process such as ADCT (Adaptive Discrete Cosine Transform) and Huffman coding which is of an entropy coding method.

The obtained code data is read from the JPEG circuit 27 and stored as a data file of one image in the storage memory 28 which is of a recording medium of the digital camera 1. The control unit 22 conducts the path from the CCD 13 to the DRAM 21 again, when the compression process of the luminance signal and the color-difference signals of one frame and the compressed data write in the storage memory 28 are ended.

In a reproduction mode which is of the basic mode, the control unit 22 selectively reads image data recorded in the storage memory 28, the JPEG circuit 27 expands the compressed image data in the completely reverse procedure of the procedure of compressing the data in the image photograph mode, and the expanded image data is developed and stored in the VRAM 24 through the VRAM controller 23. The image data is periodically read from the VRAM 24, the video signal is generated based on the image data, and the reproduction image is outputted (displayed) on the liquid crystal monitor screen 4 of the display unit 26.

The key input unit 30 includes the mode dial 3, the cursor key 5, the set key 6, the zoom lever 7, the shutter key 8, the power button 9, and the menu key 10. The signal associated with the key operation in the key input unit 30 is directly transmitted to the control unit 22.

The mode dial 3 switches the recording mode and the reproduction mode. In the mode setting or the menu selection, the cursor key 5 is operated when the menus, icons, and the like displayed on the liquid crystal monitor screen 4 is pointed (designated) by a cursor. The cursor can be moved in a vertical direction or in a horizontal direction by the operation of the cursor key 5.

The set key 6 is pressed when selection setting or confirmation of items cursor-displayed by the cursor key 5 is performed. For example, in a later-mentioned focusing range setting screen of FIGS. 3A, 3B, 4A, and 4B (or FIGS. 7A, 7B, 7C, 7D, and 9), an operator can set a macro photograph mode and the focusing range of the normal photograph mode by the operations of the cursor key 5 and the set key 6.

The zoom lever 7 is used for a zoom operation. In the case of a digital zoom, although a zoom value is determined according to the operation of the zoom lever 7, an actual angle of view is not changed, and the image having a size corresponding to the zoom value is displayed on the liquid crystal monitor screen 4 by trimming the image.

In the case of an optical zoom, a zoom lens (variable-focal-length lens) is moved onto a wide-side or a tele-side according to the operation of the zoom lever 7. The zoom value is determined according to the operation of the zoom lever 7, the angle of view is actually changed by following the change in zoom value, and the wide-angle image or the tele-image is displayed on the liquid crystal monitor screen 4.

The shutter key 8 performs a release operation in taking the image. The shutter key 8 has a two-stage stroke. A focusing instruction signal for performing auto focus (AF) and auto exposure (AE) is generated in the first-stage operation (half-press state), and a photographing instruction signal for performing the photographing process is generated in the second-stage operation (full-press state).

The menu key 10 is operated when the menu is displayed. The selection menus which are selectable at that time are displayed when the menu key 10 is pressed.

Figure 3A:
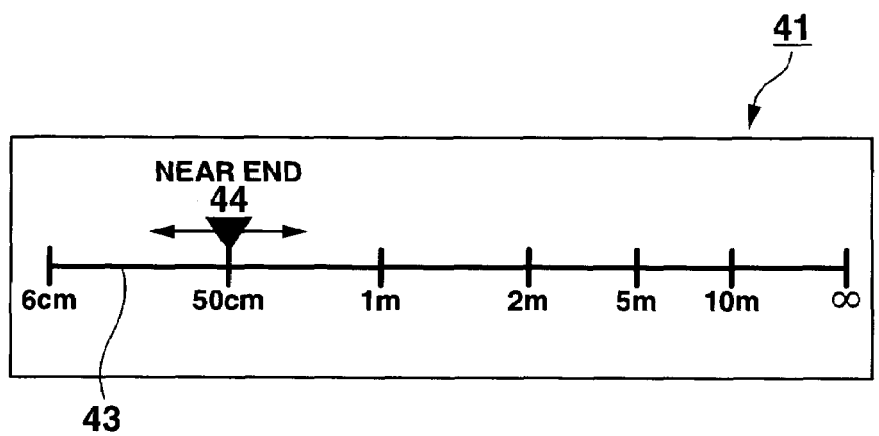
FIGS. 3A and 3B are an explanatory view showing an example of focusing range setting in a normal photograph mode of the first embodiment.
Figure 3B:
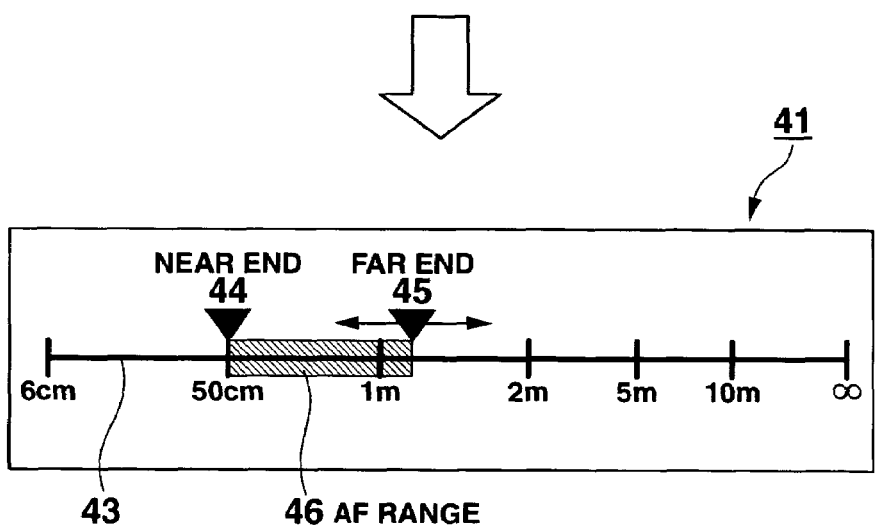
Figure 4A:
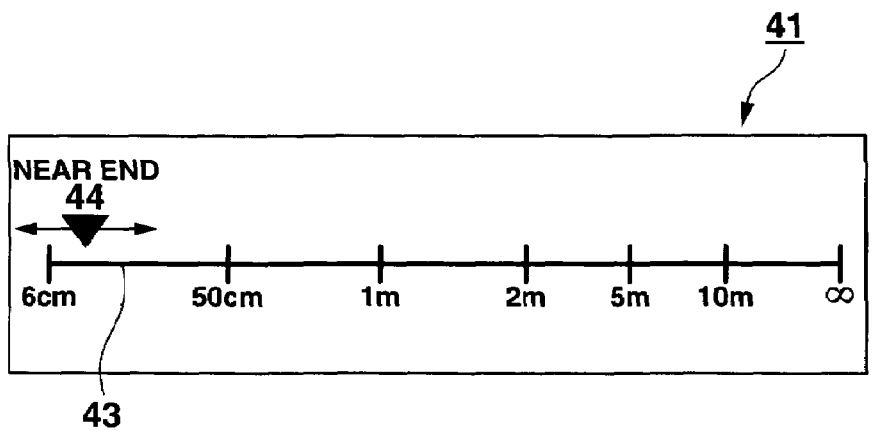
FIGS. 4A and 4B are an explanatory view showing an example of the focusing range setting in a macro photograph mode of the first embodiment.
Figure 4B:
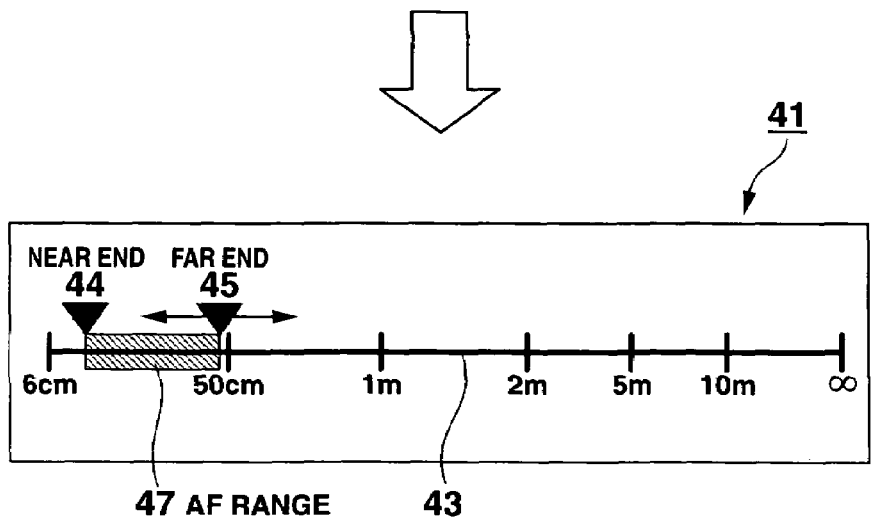

FIGS. 3A and 3B are an explanatory view showing an example of the focusing range setting in the normal photograph mode, and FIGS. 4A and 4B are an explanatory view showing an example of the focusing range setting in the macro photograph mode.

In FIGS. 3A and 3B and FIGS. 4A and 4B, the numeral 41 designates a focusing range setting screen, the numeral 43 designates a number line indicating the whole region from the shortest distance to infinity, the numeral 44 designates a mark meaning a near end of the focusing range, the numeral 45 designates a mark meaning a far end of the focusing range, the numeral 46 designates an example of the focusing range set for the normal photograph mode, and the numeral 47 designates an example of the focusing range set for the macro photograph mode.

As shown in FIGS. 3A and 3B and FIGS. 4A and 4B, in the focusing range setting screen 41, the numeric characters indicating distances such as 6 cm, 50 cm, 1 m, 2 m, 5 m, 10 m, and ∞ are displayed on the number line 43, and an arbitrary range can be selected by the cursor.

When the focusing range is set in the normal photograph mode, after the operator determines the near end 44 on the number line 43 shown in the focusing range setting screen 41 as shown in FIG. 3A, the operator determines the far end 45 to determine the focusing range 46 for the normal photograph mode as shown in FIG. 3B.

When the focusing range is set in the macro mode, after the operator determines the near end 44 on the number line 43 shown in the focusing range setting screen 41 as shown in FIG. 4A, the operator determines the far end 45 to determine the focusing range 47 for the macro photograph mode as shown in FIG. 4B.

Figure 5:
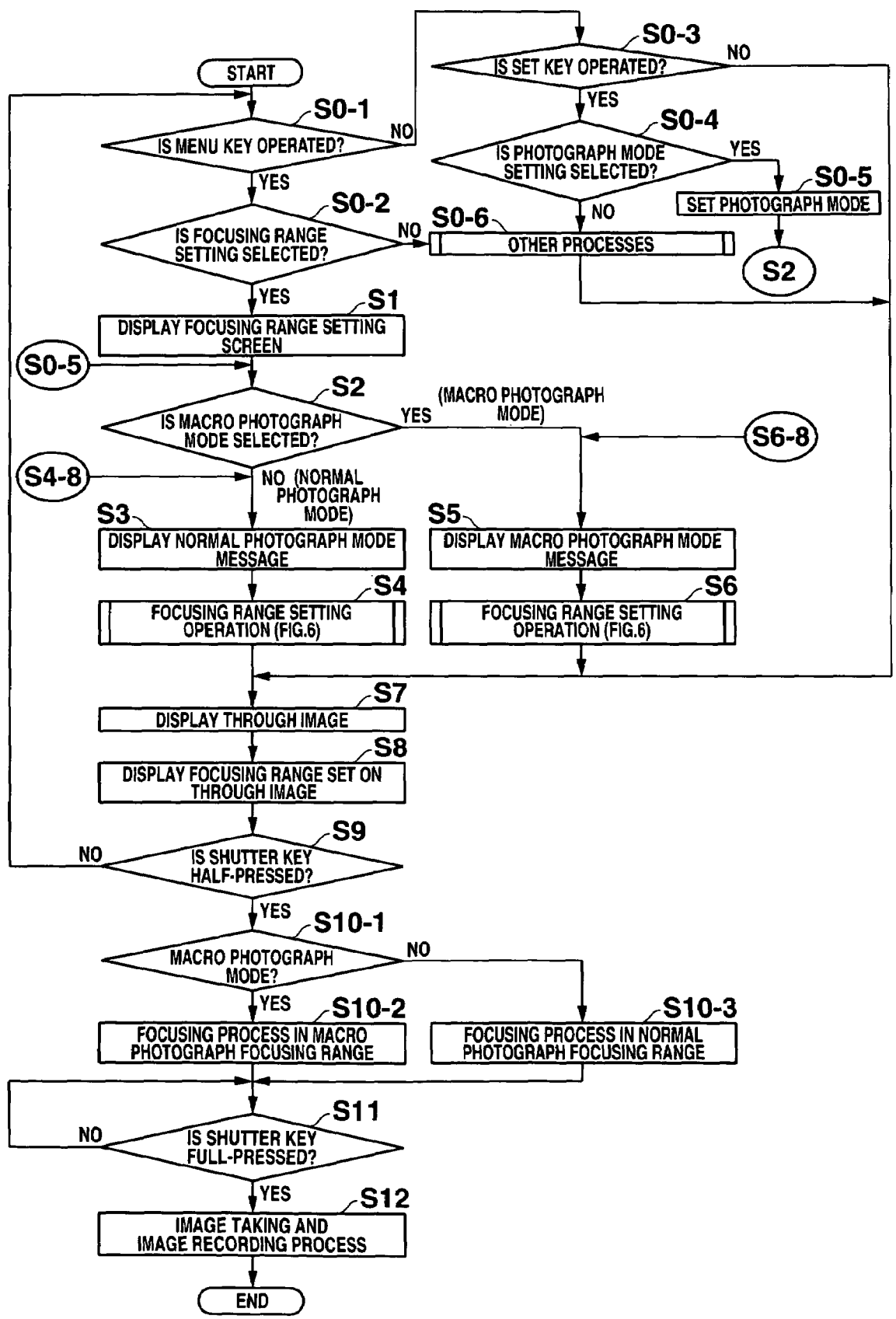
FIG. 5 is a flowchart showing an operation outline of the digital camera in a recording mode of the first embodiment.

FIG. 5 is a flowchart showing an operation outline of the digital camera 1 in the recording mode. The flowchart explains the program for realizing the functions including the focusing range setting according to the embodiment in the digital camera 1. The program shall have a conversion table (not shown) for converting the focusing distance range arbitrarily set by the operator into a lens movement range.

In the following process, basically the control unit 22 performs the process according to the program previously stored in the program memory such as the flash memory. However, it is unnecessary that all the functions are stored in the program memory, and the control unit 22 may perform the process by receiving a part of or all the functions through a network as needed. The process will be described below with reference to FIG. 1A to FIG. 5.

Because the operator presses the menu key 10 when the operator sets the focusing range in the recording mode, the control unit 22 checks the signal from the key input unit 30 in step S0-1. When the menu key 10 is pressed, the flow goes to step S0-2. When the menu key 10 is not pressed, the flow goes to step S0-3. It is assumed that an initial value of a photograph mode flag reserved in a predetermined area of RAM is set at "0".

When the menu key 10 is pressed, the control unit 22 displays the menus including a "focusing range setting" menu on the liquid crystal monitor screen 4. When the operator selects the "focusing range_setting" menu (YES in step S0-2) by operating the cursor key 5 and the set key 6, the flow goes to step S1. When the operator selects other menus, the flow goes to step S0-6.

The control unit 22 checks the signal from the key input unit 30 in step S0-1. When the set key 6 is pressed (YES in step S0-3), the flow goes to step S0-4. When the set key 6 is not pressed (NO in step S0-3), the flow goes to step S7.

When the set key 6 is pressed in step S0-3, the control unit 22 displays a "photograph mode selection" screen (not shown) on the liquid crystal monitor screen 4 to encourage the operator to select the "macro photograph mode" or the "normal photograph mode" (step S0-4). When the operator selects the "macro photograph mode" by operating the cursor key 5 and the set key 6 in step S0-5, the control unit 22 set the value of the photograph mode flag (initial value="0") at "1", and the flow goes to step S2. When the operator selects the normal photograph mode" in step S0-5, the control unit 22 set the value of the photograph mode flag (initial value="0") at "0", and flow goes to step S2. When the operator selects other menus, the control unit 22 performs the process corresponding to the menu selected in step S0-6, and the flow goes to step S7.

In step S1, the control unit 22 reads focusing range setting screen data stored in the program memory, and the control unit 22 supplies the focusing range setting screen data to the digital video encoder 25 through the VRAM controller 23 to generate the video signal. Then, the digital video encoder 25 outputs the video signal to the display unit 26, and a focusing range setting screen (for example, focusing range setting screen 41 of FIG. 3A) is displayed on the liquid crystal monitor screen 4.

In step S2, the control unit 22 checks the value of the photograph mode flag. When the value of the photograph mode flag is "1", the control unit 22 determines that the macro photograph mode is selected, and the flow goes to step S5. When the value of the photograph mode flag is "0", the control unit 22 determines that the normal photograph mode is selected, and the flow goes to step S3.

Figure 6:
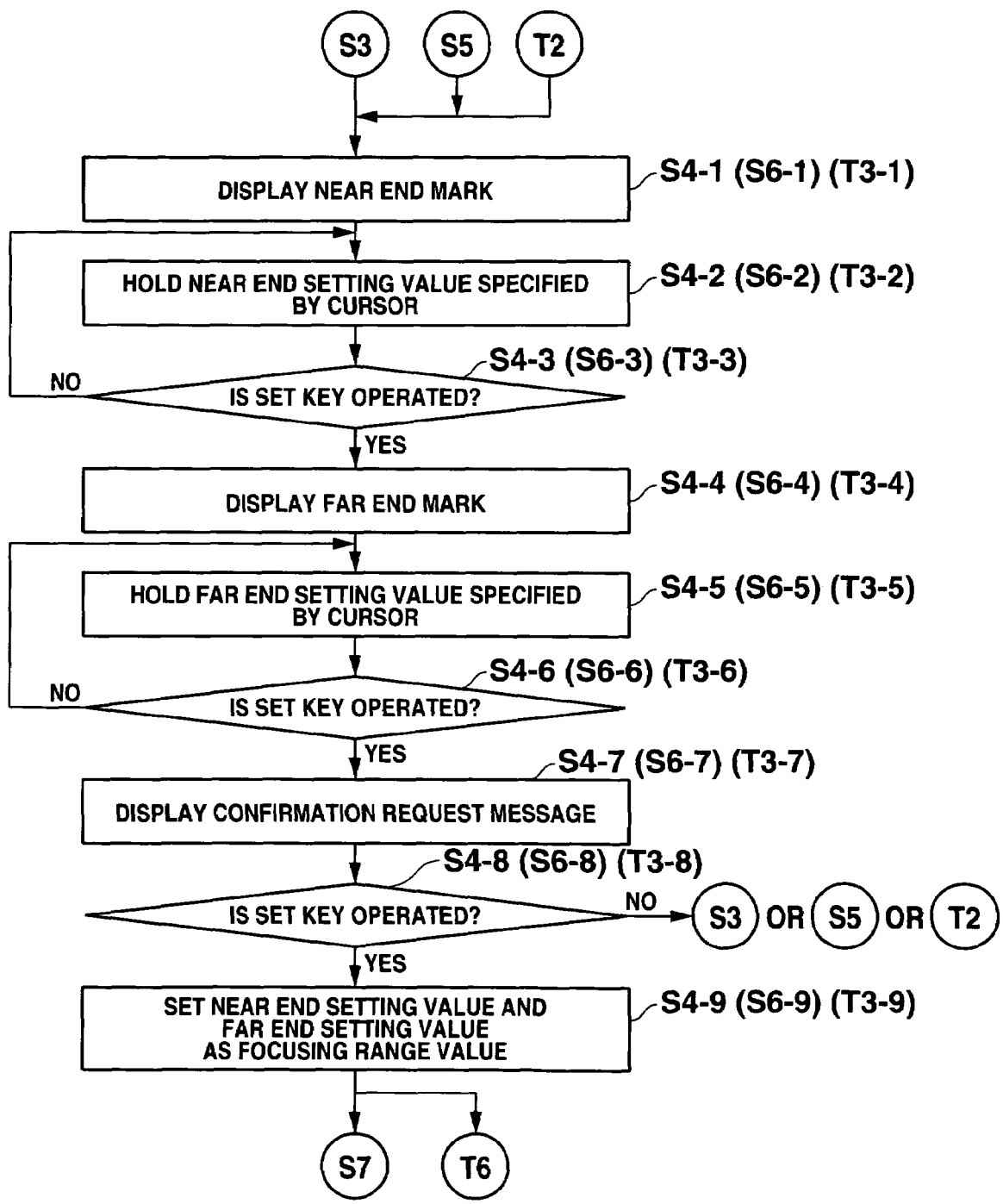
FIG. 6 is a flowchart showing a detail of a focusing range setting operation in the flowchart of FIG. 5.

In the case of the normal photograph mode, in step S3, the control unit 22 generates message data for encouraging the operator to perform the focusing range setting in the normal photograph mode (for example, "Set normal photograph focusing range in order of near end and far end with cursor key. Press set key when photograph is taken with standard focusing range"), the control unit 22 supplies the message data to the digital video encoder 25 through the VRAM controller 23 to generate the video signal, and the message is displayed at a predetermined position in the focusing range setting screen displayed on the liquid crystal monitor screen 4. In step S4, when the operator specifies the normal photograph focusing range by operating the cursor key 5 and the set key 6, the control unit 22 sets (stores) the values of the near end 44 and the far end 45 of the specified focusing range in a normal photograph focusing range setting area reserved in a predetermined area of RAM, the control unit 22 clears the liquid crystal monitor screen 4, and the flow goes to step S7. FIG. 6 shows the detailed operation in the focusing range setting (step S4).

In the case where the macro photograph mode is selected in step S2, in step S5, the control unit 22 generates the message data for encouraging the operator to perform the focusing range setting in the macro photograph mode (for example, "Set macro photograph focusing range in order of near end and far end with cursor key. Press set key when photograph is taken with standard focusing range"), the control unit 22 supplies the message data to the digital video encoder 25 through the VRAM controller 23 to generate the video signal, and the message is displayed at the predetermined position in the focusing range setting screen displayed on the liquid crystal monitor screen 4. When the operator specifies the macro photograph focusing range by operating the cursor key 5 and the set key 6, in step S6, the control unit 22 sets (stores) the values of the near end 44 and the far end 45 of the specified focusing range in a macro photograph focusing range setting area reserved in a predetermined area of RAM, the liquid crystal monitor screen 4 is cleared, and the flow goes to step S7. FIG. 6 shows the detailed operation in the focusing range setting (step S6).

In step S7, the control unit 22 performs the AE process in the focal distance corresponding to the zoom value at that time, the control unit 22 obtains the image data from the CCD 13, and the color process circuit 18 performs adjustment such that white balance is obtained corresponding to a light source color by an automatic white balance (AWB) process. Then, while the control unit 22 performs the DMA transmission of the image data to the DRAM 21 through the DMA controller 19 and the DRAM interface (I/F) 20, the control unit 22 updates the VRAM 24 with the video through image data in which the image data from the CCD 13 is sampled, and the through image is displayed on the liquid crystal monitor screen 4 of the display unit 26.

In step S8, the control unit 22 displays a mark and a drawing or a numerical value in a superposing manner at a predetermined position in the through image on the liquid crystal monitor screen 4. The mark shows the photograph mode currently selected and set. The drawing (for example, as shown in FIG. 3B or FIG. 4B, the focusing range is displayed in a band portion with the near end mark 44 and far end mark 45 on the number line 43 and the focusing range 46 or 47) or the numerical value shows the focusing range which is set in step S4 or step S6 and corresponds to the photograph mode currently selected and set.

In step S9, the control unit 22 checks the signal from the key input unit 30. When the shutter key 8 is half-pressed, the flow goes to step S10-1. When the shutter key 8 is not pressed, the flow returns to step S0-1.

In step S10-1, the control unit 22 checks the photograph mode. In the case of the macro photograph mode, the flow goes to step S10-2. In the case of the normal photograph mode, the flow goes to step S10-3.

In the case of the macro photograph mode, in step S10-2, the control unit 22 controls the AF drive unit 11 such that the predetermined focus area is brought into focus, and the control unit 22 performs the auto focusing process such that the focusing position is detected in the currently set macro photograph mode focusing range, i.e., in the focusing range set (stored) in the macro photograph focusing range setting area.

That is, the control unit 22 performs the focusing operation by moving the focus lens within the movement range set in step S4 or step S6. When the focusing process is ended, the focusing position is locked, and the flow goes to step S11.

In the case of the normal photograph mode, in step S10-3, the control unit 22 controls the AF drive unit 11 such that the predetermined focus area is brought into focus, the control unit 22 performs the auto focusing process such that the focusing position is detected in the currently set normal photograph mode focusing range, i.e., in the focusing range set (stored) in the normal photograph focusing range setting area. When the auto focusing process is ended, the focusing position is locked, and the flow goes to step S11.

In step S11, the control unit 22 checks the signal from the key input unit 30 to determine whether the shutter key 8 is full-pressed or not. When the shutter key 8 is full-pressed, the flow goes to step S12.

When the shutter key 8 is full-pressed, in step S12, the control unit 22 performs the photographing process at that time. That is, after the one-frame image data output from the CCD 13 is transmitted to the DRAM 21 by the DMA transmission, the path from the CCD 13 to the DRAM 21 is immediately disconnected or the actual photographing process is performed by switching a CCD drive method in capturing the through image to the CCD drive method in taking the photograph. After the image compression process is performed to the image data, the compressed image data (image file) is recorded to end the photographing of one-frame image.

FIG. 6 is a flowchart showing a detail of the focusing range setting operation in the normal photograph mode of step S4 in the flowchart of FIG. 5.

After the focusing range setting message is displayed in the normal photograph mode in step S3 of FIG. 5, the control unit 22 displays the near end mark 44 at a standard distance position (for example, 60 cm) on the number line 43 in the normal photograph mode (step S4-1). When the operator moves the near end mark 44 on the number line 43 toward the left direction or the right direction by operating a left key or a right key of the cursor key 5, the control unit 22 holds the value of the distance corresponding to a coordinate value at the position of the near end mark 44 after the movement as a near end setting value (step S4-2). Further, the control unit 22 checks whether the set key 6 is pressed or not (step S4-3). When the set key 6 is pressed, the flow goes to step S4-4. When the set key 6 is not pressed, the flow returns to step S4-2, and the control unit 22 waits the operator's operation of the movement of the near end mark 44 with the left key or the right key of the cursor key 5 and/or the operation of the set key 6. In step S4-3, when the set key 6 is pressed without pointing the left key or the right key of the cursor key 5, it is assumed that the standard value is specified, the control unit 22 holds the standard value as the near end setting value, and the flow goes to step S4-4.

The above process may be modified as follows. In step S4-2, the value of the distance corresponding to the coordinate value of the position of the near end mark 44 is not held as the near end setting value, and the operation in which the value of the distance corresponding to the coordinate value of the position of the near end mark 44 is held as the near end setting value may be performed only in the case where it is determined that the set key 6 is pressed in step S4-3.

In step S4-1, the near end mark 44 is displayed at the position of the standard distance on the number line 43. Alternatively, the near end mark 44 may be displayed at the position on the number line 43 corresponding to the value of the currently set distance, i.e., the value of the near end distance stored in RAM by the previous focusing range setting operation.

The control unit 22 displays the far end mark 45 at the standard distance position (for example, 60 cm) on the number line 43 in the normal photograph mode (step S4-4). When the operator moves the far end mark 45 on the number line 43 toward the left direction or the right direction by operating the left key or the right key of the cursor key 5, the control unit 22 holds the value of the distance corresponding to the coordinate value at the position of the far end mark 45 after the movement as a far end setting value (step S4-5). Further, the control unit 22 checks whether the set key 6 is pressed or not (step S4-6). When the set key 6 is pressed, the flow goes to step S4-7. When the set key 6 is not pressed, the flow returns to step S4-5, and the control unit 22 waits the operator's operation of the movement of the far end mark 45 with the left key or the right key of the cursor key 5 and/or the operation of the set key 6. In step S4-6, when the set key 6 is pressed without pointing the left key or the right key of the cursor key 5, it is assumed that the standard value is specified, the control unit 22 holds the standard value as the far end setting value, and the flow goes to step S4-7.

The above process may be modified as follows. In step S4-5, the value of the distance corresponding to the coordinate value of the position of the far end mark 45 is not held as the far end setting value, and the operation in which the value of the distance corresponding to the coordinate value of the position of the far end mark 45 is held as the far end setting value may be performed only in the case where it is determined that the set key is pressed in step S4-6.

In step S4-4, the far end mark 45 is displayed at the position of the standard distance on the number line 43. Alternatively, the far end mark 45 may be displayed at the position on the number line 43 corresponding to the value of the currently set distance, i.e., the far end value of the distance stored in RAM by the previous focusing range setting operation.

After the control unit 22 deletes the message for encouraging the operator to perform the focusing range setting in the normal photograph mode displayed in step S3 of FIG. 5, the control unit 22 encourages the operator to perform the confirmation operation by displaying the message for encouraging confirmation (for example, "Confirm setting range. When the setting range is OK, press set key. When the setting range is set again, press cursor key 5.") (step S4-7). When the operator presses the set key 6 (YES in step S4-8), the flow goes to step S4-9. When the operator does not press the set key 6, the flow returns to step S3.

The control unit 22 sets (stores) the near end setting value held in step S4-2 or step S4-3 and the far end setting value held in step S4-5 or step S4-6 in the normal photograph focusing range setting area reserved in a predetermined area of RAM, the control unit 22 clears the liquid crystal monitor screen 4, and the flow goes to step S7 of FIG. 5 (step S4-9).

The focusing range setting operation in the macro photograph mode will be described below with reference to FIG. 6 since the focusing range setting operation in the macro photograph mode in step S6 of FIG. 5 has the same structure as the flowchart showing the detail of the focusing range setting operation in the normal photograph mode. A step number in a parenthesis of FIG. 6 is used as the step number showing the process in the macro photograph mode.

After the focusing range setting message is displayed in the macro photograph mode in step S5 of FIG. 5, the control unit 22 displays the near end mark 44 at a standard distance position (for example, 60 cm) on the number line 43 in the macro photograph mode (step S6-1). When the operator moves the near end mark 44 on the number line 43 toward the left direction or the right direction by operating the left key or the right key of the cursor key 5, the control unit 22 holds the value of the distance corresponding to the coordinate value at the position of the near end mark 44 after the movement as the near end setting value (step S6-2). Further, the control unit 22 checks whether the set key 6 is pressed or not (step S6-3). When the set key 6 is pressed, the flow goes to step S6-4. When the set key 6 is not pressed, the flow returns to step S6-2, and the control unit 22 waits the operator's operation of the movement of the near end mark 44 with the left key or the right key of the cursor key 5 and/or the operation of the set key 6. In step S6-3, when the set key 6 is pressed without pointing the left key or the right key of the cursor key 5, it is assumed that the standard value is specified, the control unit 22 holds the standard value as the near end setting value, and the flow goes to step S6-4.

The above process may be modified as follows. In step S6-2, the value of the distance corresponding to the coordinate value of the position of the near end mark 44 is not held as the near end setting value, and the operation in which the value of the distance corresponding to the coordinate value of the position of the near end mark 44 is held as the near end setting value may be performed only in the case where it is determined that the set key 6 is pressed in step S6-3.

In step S6-1, the near end mark 44 is displayed at the position of the standard distance on the number line 43. Alternatively, the near end mark 44 may be displayed at the position on the number line 43 corresponding to the value of the currently set distance, i.e., the value of the near end distance stored in RAM by the previous focusing range setting operation.

The control unit 22 displays the far end mark 45 at the standard distance position (for example, 60 cm) on the number line 43 in the macro photograph mode (step S6-4). When the operator moves the far end mark 45 on the number line 43 toward the left direction or the right direction by operating the left key or the right key of the cursor key 5, the control unit 22 holds the value of the distance corresponding to the coordinate value at the position of the far end mark 45 after the movement as the far end setting value (step S6-5). Further, the control unit 22 checks whether the set key 6 is pressed or not (step S6-6). When the set key 6 is pressed, the flow goes to step S6-7. When the set key 6 is not pressed, the flow returns to step S6-5, and the control unit 22 waits the operator's operation of the movement of the far end mark 45 with the left key or the right key of the cursor key 5 and/or the operation of the set key 6. In step S6-6, when the set key 6 is pressed without pointing the left key or the right key of the cursor key 5, it is assumed that the standard value is specified, the control unit 22 holds the standard value as the far end setting value, and the flow goes to step S6-7.

The above process may be modified as follows. In step S6-5, the value of the distance corresponding to the coordinate value of the position of the far end mark 45 is not held as the far end setting value, and the operation in which the value of the distance corresponding to the coordinate value of the position of the far end mark 45 is held as the far end setting value may be performed the only in the case where it is determined that the set key 6 is pressed in step S6-6.

In step S6-4, the far end mark 45 is displayed at the position of the standard distance on the number line 43. Alternatively, the far end mark 45 may be displayed at the position on the number line 43 corresponding to the value of the currently set distance, i.e., the far end value of the distance stored in RAM by the previous focusing range setting operation.

After the control unit 22 deletes the message for encouraging the operator to perform the focusing range setting in the macro photograph mode displayed in step S5 of FIG. 5, the control unit 22 encourages the operator to perform the confirmation operation by displaying the message for encouraging the confirmation (for example, "Confirm setting range. When the setting range is OK, press set key. When the setting range is set again, press cursor key 5.") (step S6-7). When the operator presses the set key 6 (YES in step S6-8), the flow goes to step S6-9. When the operator does not press the set key 6, the flow returns to step S5.

The control unit 22 sets (stores) the near end setting value held in step S6-2 or step S6-3 and the far end setting value held in step S6-5 or step S6-6 in the macro photograph focusing range setting area reserved in a predetermined area of RAM, the control unit 22 clears the liquid crystal monitor screen 4, and the flow goes to step S7 of FIG. 5 (step S6-9).

When the operator specifies the focusing ranges of the macro photograph mode and the normal photograph mode by the operations shown in the flowcharts of FIGS. 5 and 6, the digital camera 1 can perform the focusing operation of the photograph mode selected by the operator in the specified focusing range. Since the operator can specify the focusing ranges of the macro photograph mode and the normal photograph mode, the image can be captured in focus within the desired focusing range in the desired photograph mode.

In accordance with the first embodiment, the focusing range setting screen 41 in which the number line 43 showing the whole region ranging from the close range to infinity and the distance value shown on the number line 43 are included is displayed, the near end position (near end distance) on the number line 43 is set by the cursor specification, and the far end position (far end distance) on the number line 43 is set by the cursor specification. When the auto focus (AF) range 46 is displayed to receive the confirmation operation, the set focusing position is set as the focusing range (AF search range) of one of the photograph modes. The focusing range is set in the same manner for the other photograph mode. When the shutter key is half-pressed, the focusing operation is performed within the set focusing range of the selected photograph mode.

SECOND EMBODIMENT

In the first embodiment, the focusing range setting is divided into the two cases of the normal photograph mode and the macro photograph mode. However, one or more focusing ranges can be set while the focusing range setting is not divided depending on the photograph mode.

Figure 7A:
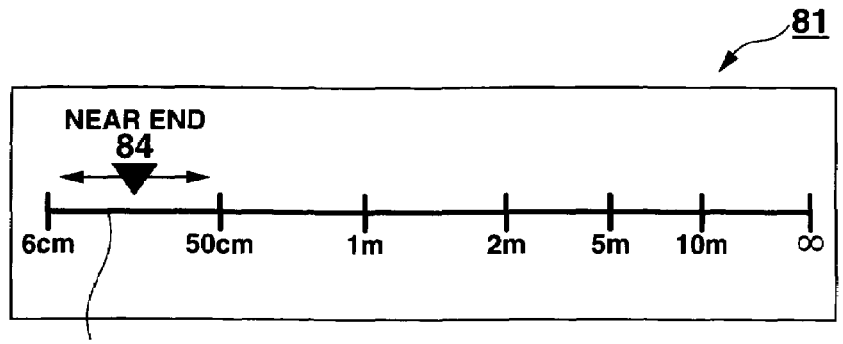
FIGS. 7A, 7B, 7C, and 7D are an explanatory view showing an example of focusing range setting of a second embodiment.
Figure 7B:
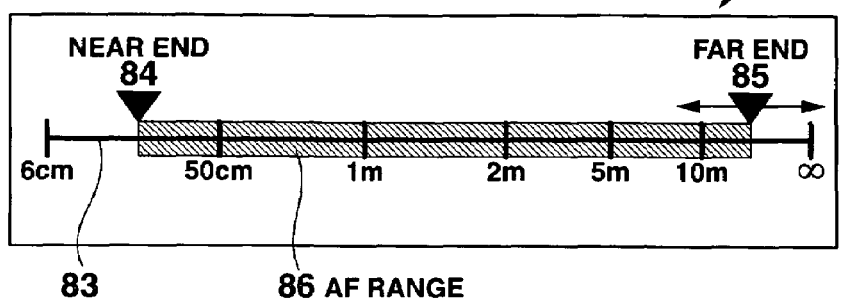
Figure 7C:
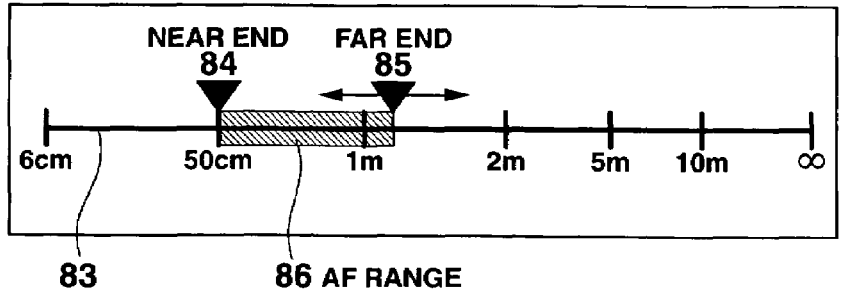
Figure 7D:
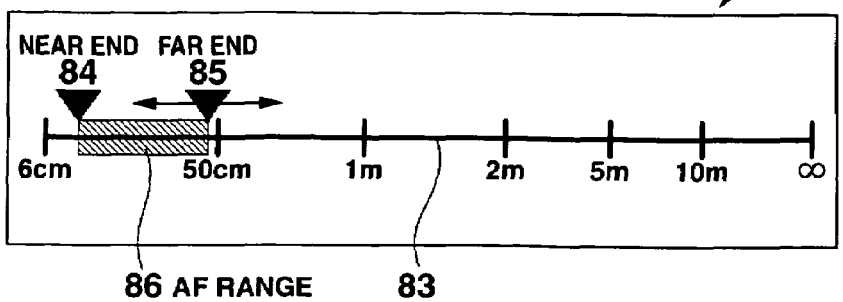

FIGS. 7A, 7B, 7C, and 7D are an explanatory view showing an example of the focusing range setting of a second embodiment. FIG. 7A shows a focusing range setting screen, and FIGS. 7B to 7D show an example of the set focusing range. The numeral 81 designates a focusing range setting screen, the numeral 83 designates a number line indicating the whole region from the shortest distance to the infinity, the numeral 84 designates a mark meaning the near end of the focusing range, the numeral 85 designates a mark meaning the far end of the focusing range, and the numeral 86 designates an example of the focusing range set for the normal photograph mode.

As shown in FIGS. 7A to 7D, in the focusing range setting screen 81, the numeric characters indicating distances such as 6 cm, 50 cm, 1 m, 2 m, 5 m, 10 m, and ∞ are displayed on a number line 83, and an arbitrary range can be selected by the cursor.

Figure 8:
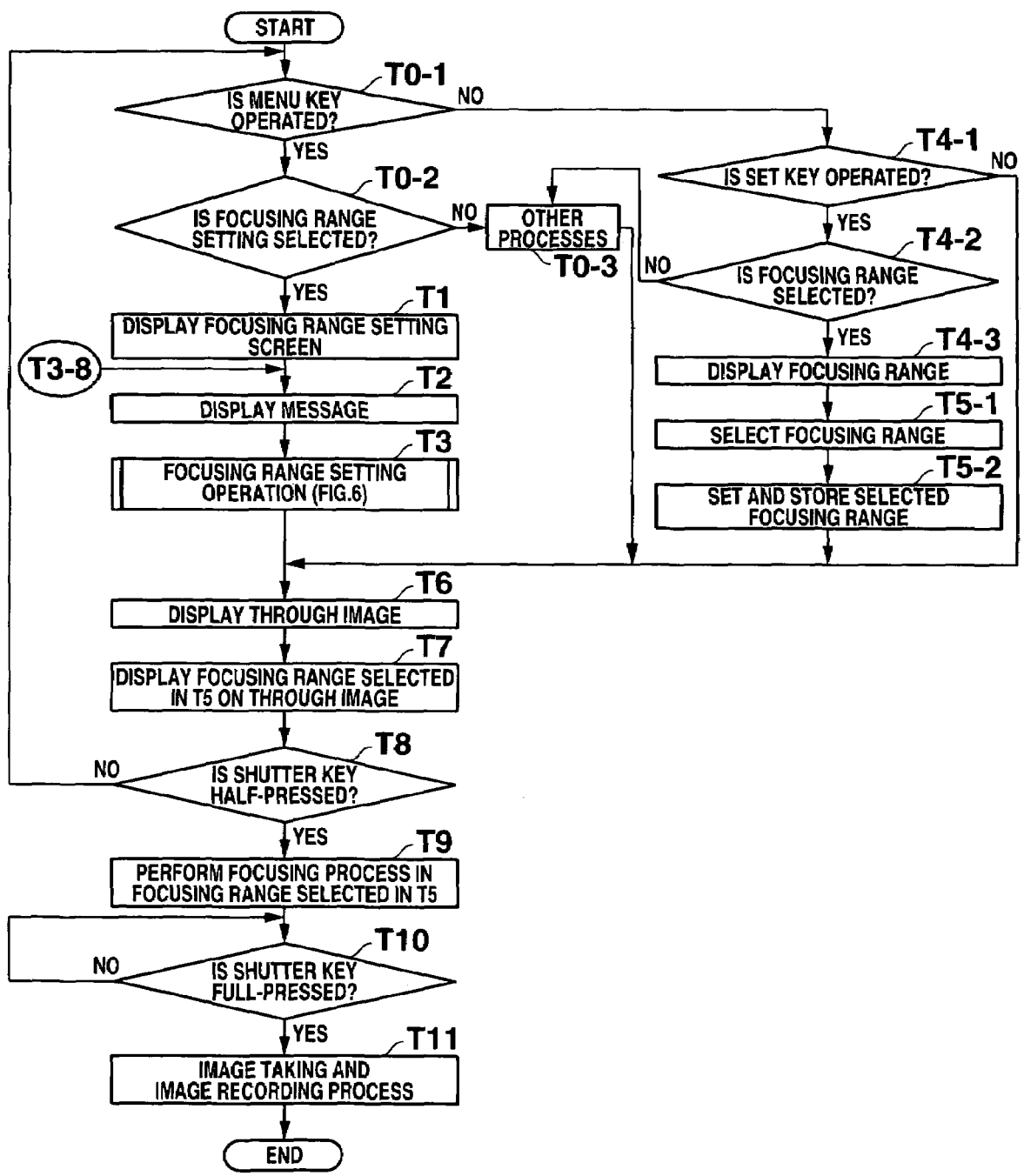
FIG. 8 is a flowchart showing an operation outline of the digital camera in the recording mode of the second embodiment.

FIG. 8 is a flowchart showing the operation outline of the digital camera 1 in the recording mode. The flowchart explains the program for realizing the functions including the focusing range setting according to the second embodiment in the digital camera 1. The program shall have the conversion table (not shown) for converting the focusing distance range arbitrarily set by the operator into the lens movement range.

In the following process, basically the control unit 22 performs the process according to the program previously stored in the program memory such as the flash memory. However, it is unnecessary that all the functions are stored in the program memory, and the control unit 22 may perform the process by receiving a part of or all the functions through a network as needed. The process will be described below with reference to FIG. 1A to 1C, FIG. 2, FIGS. 7A to 7D, and FIG. 8.

For the detailed operation during the focusing range setting in step T3 of the flowchart, the numeral 43, the numeral 44, and the numeral 45 in the description of FIG. 6 shall be changed to the numeral 83, the numeral 84, and the numeral 85 respectively, and the step S4-1 to step S4-9 in the description of FIG. 6 shall be changed to step T3-1 to step T3-9 while the following change is added.

In step T3-1, the control unit 22 displays the near end mark 44 at the standard distance position (for example, 6 cm) on the number line 43 after the focusing range setting message is displayed in step T2 of FIG. 8. In step T3-8, the flow goes to step S3-9 when the operator presses the set key 6, and flow returns to step T2 when the operator does not press the set key 6.

In step T3-9, in order to enable the setting of the plural focusing ranges, the control unit 22 sets (additionally stores) the near end setting value held in step T3-2 and the far end setting value held in step T3-5 in the focusing range setting area reserved in a predetermined area of RAM, the control unit 22 clears the liquid crystal monitor screen 4, and the flow goes to step T6 of FIG. 8.

In the recording mode, since the operator presses the menu key 10 when the operator sets the focusing range, in step T0-1, the control unit 22 checks the signal from the key input unit 30. When the menu key 10 is pressed (YES in step T0), the flow goes to step T0-2. When the menu key 10 is not pressed, the flow goes to step T4-1.

When the menu key 10 is pressed, the control unit 22 displays the menus including the "focusing range setting" menu on the liquid crystal monitor screen 4. When the operator selects the "focusing range setting" menu (YES in step T0-2) by operating the cursor key 5 and the set key 6, the flow goes to step T1. When the operator selects other menus, the flow goes to step T0-3.

When the operator selects other menus in step S0-2, the control unit 22 performs the process corresponding to the menu selected in step T0-3, and the flow goes to step T6.

In step T1, the control unit 22 reads the focusing range setting screen data stored in the program memory, and the control unit 22 supplies the focusing range setting screen data to the digital video encoder 25 through the VRAM controller 23 to generate the video signal. Then, the digital video encoder 25 outputs the video signal to the display unit 26, and the focusing range setting screen (for example, focusing range setting screen 81 of FIGS. 7A to 7D) is displayed on the liquid crystal monitor screen 4.

In step T2, the control unit 22 generates the message data for encouraging the operator to perform the focusing range setting (for example, "Set focusing range in order of near end and far end with cursor key. Press set key when photograph is taken with standard focusing range"), the control unit 22 supplies the message data to the digital video encoder 25 through the VRAM controller 23 to generate the video signal, and the message is displayed at the predetermined position in the focusing range setting screen displayed on the liquid crystal monitor screen 4. When the operator specifies the focusing range by operating the cursor key 5 and the set key 6, in step T3, the control unit 22 sets (stores) the values of the near end and the far end of the specified focusing range in the focusing range setting area reserved in the predetermined area of RAM, the control unit 22 clears the liquid crystal monitor screen 4, and the flow goes to step T6 (see FIG. 6 for the detailed operation in the focusing range setting).

The control unit 22 checks the signal from the key input unit 30 in step T4-1. When the set key 6 is pressed, the flow goes to step T4-2. When the set key 6 is not pressed, the flow goes to step T6.

When the set key 6 is pressed, in step T4-2, the control unit 22 displays a selection screen (not shown) in which the operator determines whether the focusing range is selected or not on the liquid crystal monitor screen 4. When the operator selects the display (menu or icon) of "select focusing range" by operating the cursor key 5 and the set key 6, the flow goes to step T4-3. When the operator selects the display of "Do not select focusing range", the flow goes to step T0-3. When the one set focusing range exists (not shown), the flow goes to step T5-2.

Then, in step T4-3, the control unit 22 displays the set focusing range (see FIGS. 7B to 7D) on the liquid crystal monitor screen 4, and the control unit 22 displays the message for encouraging the operator to select the focusing range (for example, "Specify and select focusing range by operating cursor key").

The control unit 22 checks the signal from the key input unit 30. When the focusing range is selected (step T5-1), the selected focusing range is set and held as the focusing range for the focusing process (step T5-2), and the flow goes to step T6. When the one set focusing range exists, the control unit 22 sets and holds the focusing range as the focusing range for the focusing process, and the flow goes to step T6.

In step T6, the control unit 22 performs the AE process in the focal distance corresponding to the zoom value at that time, the control unit 22 obtains the image data from CCD 13, and the color process circuit 18 performs adjustment such that the white balance is obtained corresponding to the light source color by the automatic white balance (AWB) process. Then, while the control unit 22 performs the DMA transmission of the image data to the DRAM 21 through the DMA controller 19 and the DRAM interface (I/F) 20, the control unit 22 updates the VRAM 24 with the video through image data in which the image data from CCD 13 is sampled, and the through image is displayed on the liquid crystal monitor screen 4 of the display unit 26.

In step T7, the control unit 22 displays the drawing or the numerical value in the superposing manner at the predetermined position in the through image on the liquid crystal monitor screen 4. The drawing (for example, as shown in FIGS. 7A to 7D, the focusing range is displayed in the band portion with the near end mark 84 and far end mark 85 on the number line 83 and the focusing range 86) or the numerical value shows the focusing range held in step T5.

In step T8, the control unit 22 checks the signal from the key input unit 30. When the shutter key 8 is half-pressed, the flow goes to step T9. When the shutter key 8 is not pressed, the flow returns to step T0-1.

In step T9, the control unit 22 controls the AF drive unit 11 such that an object within the predetermined focus area is focused, and the control unit 22 performs the auto focusing process such that the focusing position is detected in the focusing range held in step T5-2. That is, the control unit 22 performs the focusing operation by moving the focus lens and controlling the iris. When the focusing process ends, the focusing position is locked, and the flow goes to step T10.

In step T10, the control unit 22 checks the signal from the key input unit 30 to determine whether the shutter key 8 is full-pressed or not. When the shutter key 8 is full-pressed, the flow goes to step T11.

When the shutter key 8 is full-pressed, in step T11, the control unit 22 performs the photographing process at that time. That is, after the DMA transmission of the one-frame image data output from the CCD 13 is performed to the DRAM 21, the path from the CCD 13 to the DRAM 21 is immediately disconnected. Then, the image compression process is performed to the image data, and the compressed image data (image file) is recorded to end the photographing of one-frame image.

Thus, in the digital camera 1, since the operator can arbitrarily specify the plural focusing ranges through the operation shown in the flowchart of FIG. 8, the image in focus can be taken in the desired focusing range selected from the plural focusing ranges specified according to the change in picture composition or the change in subject.

THIRD EMBODIMENT

In the first and second embodiments, the operator sets the focusing range irrespective of the zoom stage. However, the focusing range can be set in each zoom stage.

Figure 9:
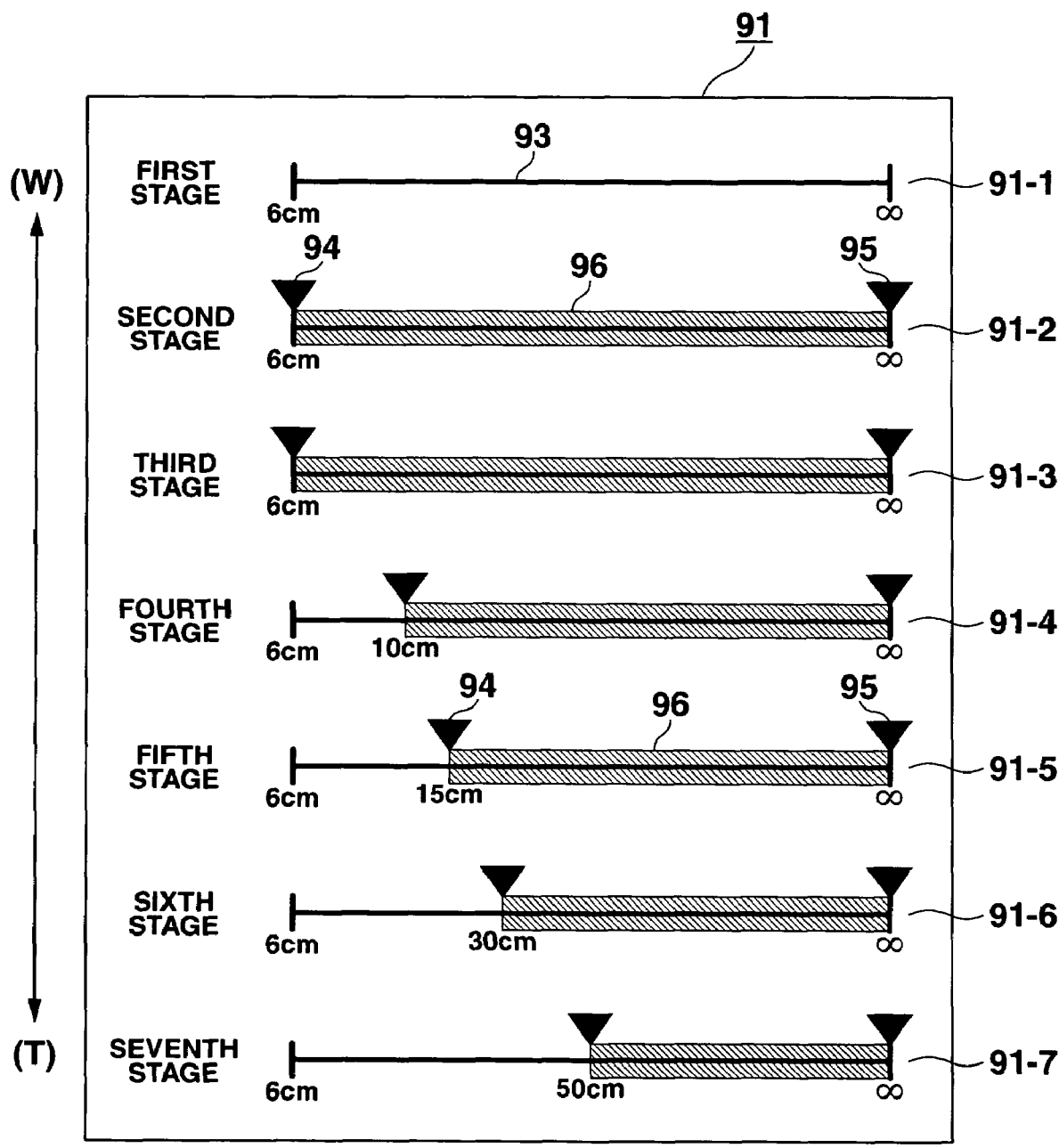
FIG. 9 is an explanatory view showing an example of focusing range setting according to a zoom step of a third embodiment.

FIG. 9 is an explanatory view showing an example of the focusing range setting according to the zoom step of the third embodiment. The numeral 91 designates a focusing range setting screen, the numeral 93 designates a number line, the numeral 94 designates a near end mark, the numeral 95 designates a far end mark, and the numeral 96 designates a focusing range.

In the focusing range setting screen 91 (91-1 to 91-7), the numeric characters indicating distances such as 6 cm, 10 cm, 15 cm, 30 cm, 50 cm and ∞ are displayed on the number line 93 in association with the zoom stages from the wide-side (W) to the tele-side (T), and an arbitrary range can be selected by the cursor.

The focusing range which can be performed in each stage is displayed on the number line 93 of each stage in the focusing range setting screen 91, and means for prohibiting the setting of the focusing range outside the focusing range in the focusing range setting, i.e., means for prohibiting the movement of the cursor or the near end mark 94 located outside the focusing range may be provided.

Figure 10:
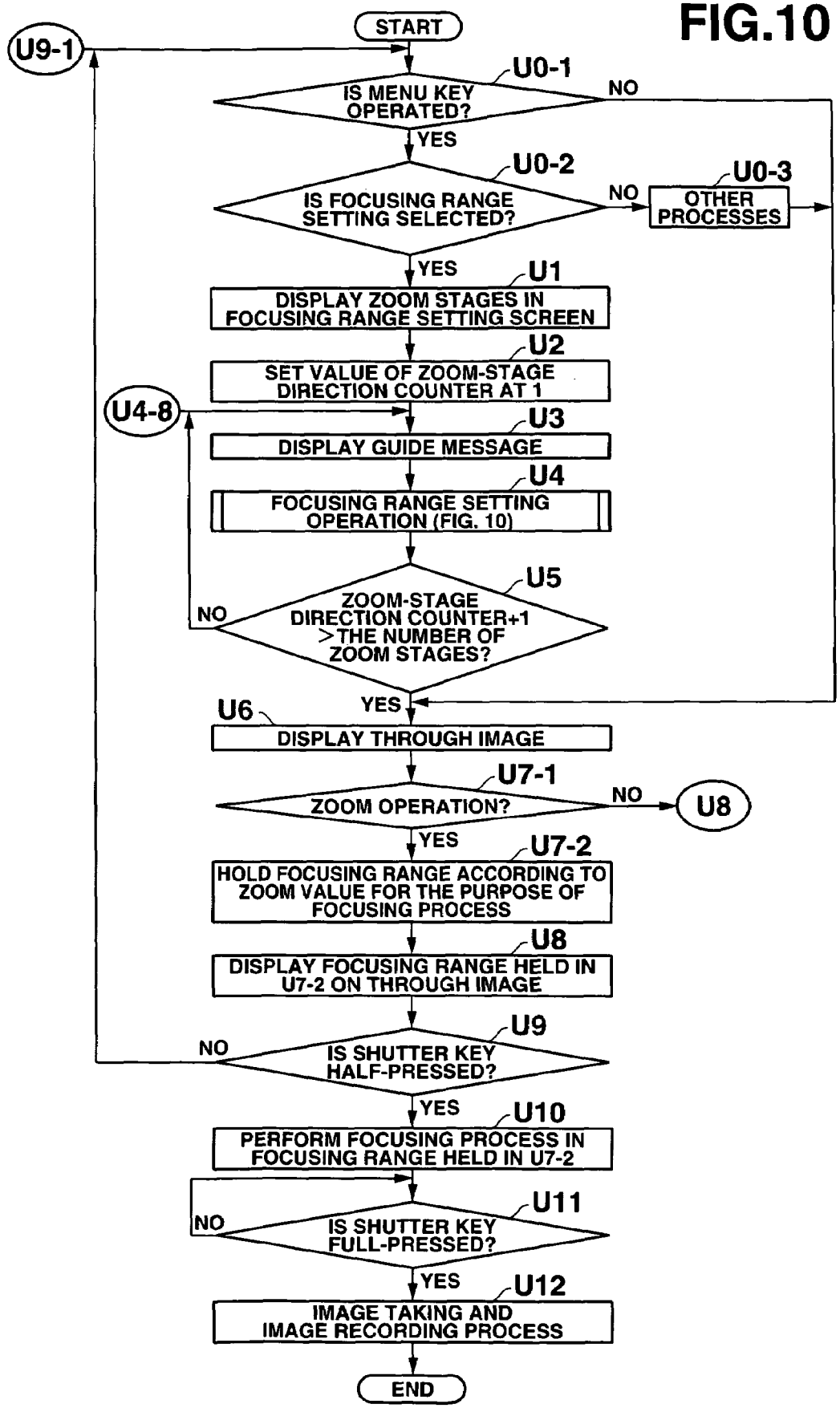
FIG. 10 is a flowchart showing the operation outline of the digital camera in the recording mode of the third embodiment.

FIG. 10 is a flowchart showing the operation outline of the digital camera 1 in the recording mode. The flowchart explains the program for realizing the functions including the focusing range setting according to the third embodiment in the digital camera 1. The program shall have the conversion table (not shown) for converting the focusing distance range arbitrarily set by the operator into the lens movement range.

In the following process, basically the control unit 22 performs the process according to the program previously stored in the program memory such as the flash memory. However, it is unnecessary that all the functions are stored in the program memory, and the control unit 22 may perform the process by receiving a part of or all the functions through a network as needed. The process will be described below with reference to FIG. 1A to 1C, FIG. 2, and FIGS. 9 to 11.

In the recording mode, since the operator presses the menu key 10 when the operator sets the focusing range, in step U0-1, the control unit 22 checks the signal from the key input unit 30. When the menu key 10 is pressed, the flow goes to step U0-2. When the menu key 10 is not pressed, the flow goes to step U6.

When the menu key 10 is pressed, the control unit 22 displays the menus including the "focusing range setting" menu on the liquid crystal monitor screen 4. When the operator selects the "focusing range setting" menu by operating the cursor key 5 and the set key 6 (Yes in step U0-2), the flow goes to step U1. When the operator selects other menus, the flow goes to step U0-3. When the operator selects other menus in step U0-3, the control unit 22 performs the process (not shown) corresponding to the selected menu selected, and the flow goes to step U6.

In step U1, the control unit 22 reads the focusing range setting screen data stored in the program memory, and the control unit 22 supplies the focusing range setting screen data to the digital video encoder 25 through the VRAM controller 23 to generate the video signal. Then, the digital video encoder 25 outputs the video signal to the display unit 26, and the focusing range setting screen 91 is displayed on the liquid crystal monitor screen 4.

Figure 11:
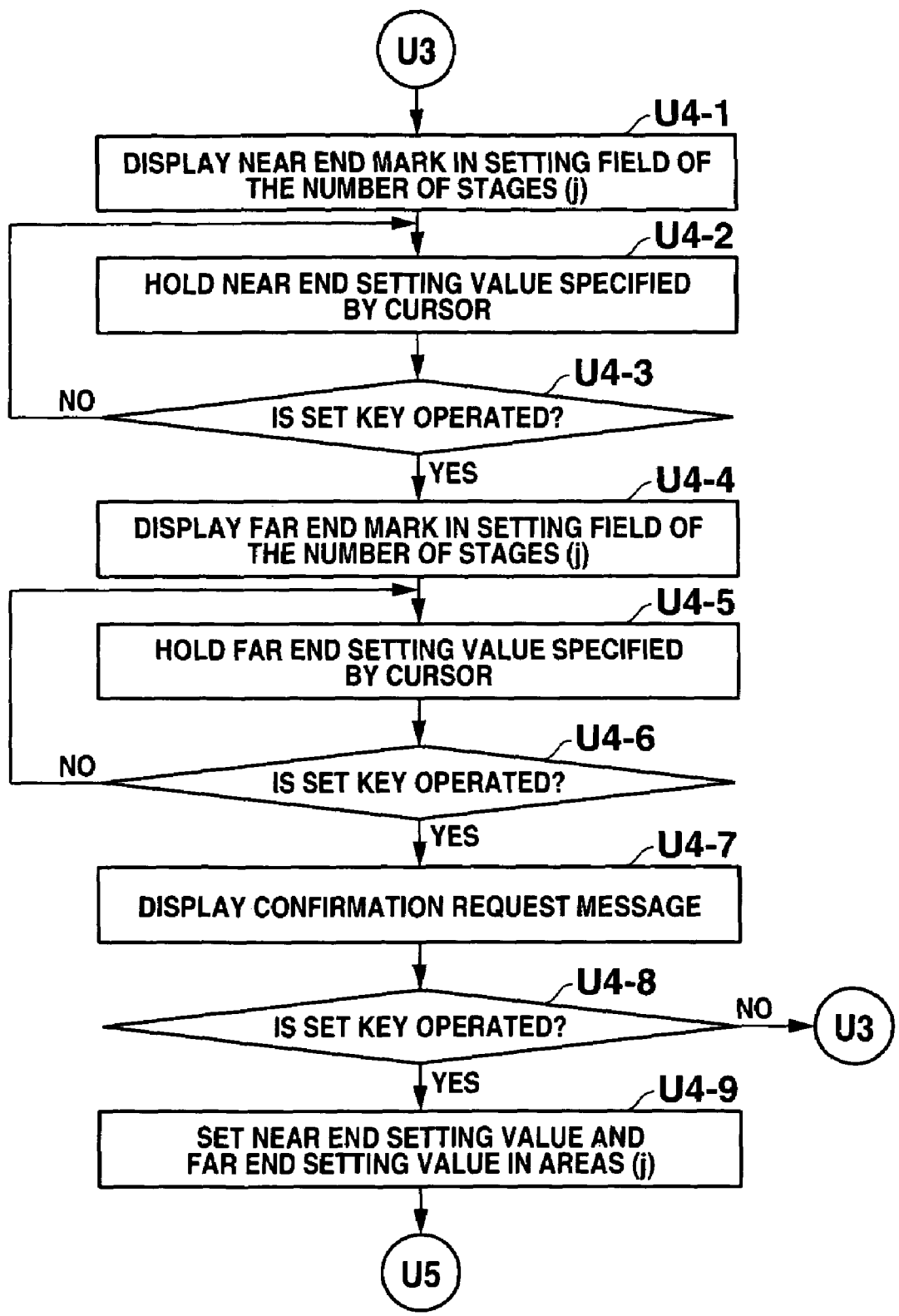
FIG. 11 is a flowchart showing a detail of the focusing range setting operation in the flowchart of FIG. 10.

After the control unit 22 sets the value of a zoom-stage direction counter at 1 in step U2, in step U3, the control unit 22 generates guide message data for encouraging the operator to perform the focusing range setting (for example, "Set focusing range of zoom stage 91-j (j is counter value) in order of near end and far end with cursor key. Press set key when photograph is taken with standard focusing range"), the control unit 22 supplies the message data to the digital video encoder 25 through the VRAM controller 23 to generate the video signal, and the message is displayed at the predetermined position in the focusing range setting screen displayed on the liquid crystal monitor screen 4. When the operator specifies the focusing range by operating the cursor key 5 and the set key 6, in step U4, the control unit 22 sets (stores) the values of the near end and the far end of the specified focusing range in the focusing range setting area (j) reserved in the predetermined area of RAM, the control unit 22 clears the liquid crystal monitor screen 4, and the flow goes to step U5. The detailed operation in the focusing range setting (step U4) is shown in FIG. 11.

In step U5, the control unit 22 increments the zoom-stage direction counter by 1, and the control unit 22 checks whether the counter value exceeds the number of displayed zoom stages (7 in FIG. 9) or not. When the counter value exceeds the number of zoom stages, the flow goes to step U6. When the counter value does not exceed the number of zoom stages, the flow returns to step U3.

In step U6, the control unit 22 performs the AE process in the focal distance corresponding to the zoom value at that time, the control unit 22 obtains the image data from the CCD 13, and the color process circuit 18 performs adjustment such that the white balance is obtained corresponding to the light source color by the automatic white balance (AWB) process. Then, while the control unit 22 performs the DMA transmission of the image data to the DRAM 21 through the DMA controller 19 and the DRAM interface (I/F) 20, the control unit 22 updates the VRAM 24 with the video through image data in which the image data from the CCD 13 is sampled, and the through image is displayed on the liquid crystal monitor screen 4 of the display unit 26.

In step U7-1, the control unit 22 determines whether zoom control is required or not. When the zoom control is required, the flow goes to step U7-2. When the zoom control is not required, the flow goes to step U8.

In the case of the optical zoom, whether the zoom control is required or not is checked by the signal from the key input unit 30. When a zoom key 7 is pressed, it can be determined that the zoom control is required. In the case of the electronic zooming process, the previous and next zoom values obtained by the electronic zooming process are compared to each other. When the zoom values differ from each other, it can be determined that the zoom control is required.

In the case where it is determined that the zoom control is required, in step U7-2, the control unit 22 transmits a control signal to the zoom drive unit 11-1 to perform the zoom operation, i.e., the zoom lens is moved by driving a zoom lens drive motor according to the zoom stage, and the control unit 22 obtains the zoom value to hold the focusing range of the corresponding zoom stage for the purpose of the focusing process. In the case of the electronic zoom, the control unit 22 holds the focusing range of the zoom stage corresponding to the zoom value obtained by the electronic zooming process for the purpose of the focusing process.

In step U8, the control unit 22 displays the drawing or the numerical value which shows the focusing range held in step U7-2 in the superposing manner at the predetermined position in the through image on the liquid crystal monitor screen 4.

In step U9, the control unit 22 checks the signal from the key input unit 30. When the shutter key 8 is half-pressed, the flow goes to step U10. When the shutter key 8 is not pressed, the flow returns to step U0-1.

In step U10, the control unit 22 controls the AF drive unit 11 such that an object within the predetermined focus area is focused, and the control unit 22 performs the auto focusing process such that the focusing position is detected in the focusing range held in step U7-2. That is, the control unit 22 performs the focusing operation by moving the focus lens and by controlling the iris. When the focusing process ends, the focusing position is locked, and the flow goes to step U11.

In step U11, the control unit 22 checks the signal from the key input unit 30 to determine whether the shutter key 8 is full-pressed or not. When the shutter key 8 is full-pressed, the flow goes to step U12.

When the shutter key 8 is full-pressed, in step U12, the control unit 22 performs the photographing process at that time. That is, after the DMA transmission of the one-frame image data output from CCD 13 is performed to the DRAM 21, the path from the CCD 13 to the DRAM 21 is immediately disconnected. Then, the image compression process is performed to the image data, and the compressed image data (image file) is recorded to end the photographing of one-frame image.

FIG. 11 is a flowchart showing a detail of the focusing range setting operation in step U4 of the flowchart of FIG. 10.

After the focusing range setting message is displayed in step U3 of FIG. 10, the control unit 22 displays the near end mark 94 at the standard distance position (for example, 60 cm) on the number line 93-j of the number of stages j showing the value of the zoom direction counter (step U4-1). When the operator moves the near end mark 94 on the number line 93-j toward the left direction or the right direction by operating a left key or a right key of the cursor key 5, the control unit 22 holds the value of the distance corresponding to a coordinate value at the position of the near end mark 94 after the movement as the near end setting value (step U4-2). Further, the control unit 22 checks whether the set key 6 is pressed or not (step U4-3). When the set key 6 is pressed, the flow goes to step U4-4. When the set key 6 is not pressed, the flow returns to step U4-2, and the control unit 22 waits the operator's operation of the movement of the near end mark 94 with the left key or the right key of the cursor key 5 and/or the operation of the set key 6. In step U4-3, when the set key 6 is pressed without pointing the left key or the right key of the cursor key 5, it is assumed that the standard value for the zoom stage is specified, the control unit 22 holds the standard value as the near end setting value of the zoom stage (j), and the flow goes to step U4-4.

The above process may be modified as follows. In step U4-2, the value of the distance corresponding to the coordinate value of the position of the near end mark 94 is not held as the near end setting value, and the operation in which the value of the distance corresponding to the coordinate value of the position of the near end mark 94 is held as the near end setting value may be performed only in the case where it is determined that the set key 6 is pressed in step U4-3.

In step U4-1, the near end mark 94 is displayed at the position of the standard distance on the number line 93-j. Alternatively, the near end mark 94 may be displayed at the position on the number line 93-j corresponding to the value of the currently set distance, i.e., the near end value of the distance stored in RAM by the previous focusing range setting operation.

The control unit 22 displays the far end mark 95 at the standard distance position (for example, 60 cm) on the number line 93-j (step U4-4). When the operator moves the far end mark 95 on the number line 93-j toward the left direction or the right direction by operating the left key or the right key of the cursor key 5, the control unit 22 holds the value of the distance corresponding to the coordinate value at the position of the far end mark 95 after the movement as a far end setting value (step U4-5). Further, the control unit 22 checks whether the set key 6 is pressed or not (step U4-6). When the set key 6 is pressed, the flow goes to step U4-7. When the set key 6 is not pressed, the flow returns to step U4-5, and the control unit 22 waits the operator's operation of the movement of the far end mark 95 with the left key or the right key of the cursor key 5 and/or the operation of the set key 6. In step U4-6, when the set key 6 is pressed without pointing the left key or the right key of the cursor key 5, it is assumed that the standard value of the zoom stage is specified, the control unit 22 holds the standard value as the far end setting value of the zoom stage (j), and the flow goes to step U4-7.

The above process may be modified as follows. In step U4-5, the value of the distance corresponding to the coordinate value of the position of the far end mark 95 is not held as the far end setting value, and the operation in which the value of the distance corresponding to the coordinate value of the position of the far end mark 95 is held as the far end setting value may be performed only in the case where it is determined that the set key 6 is pressed in step U4-6.

In step U4-4, the far end mark 95 is displayed at the position of the standard distance on the number line 93-j. Alternatively, the far end mark 95 may be displayed at the position on the number line 93-j corresponding to the value of the currently set distance, i.e., the far end value of the distance stored in RAM by the previous focusing range setting operation.

After the control unit 22 deletes the message for encouraging the operator to perform the focusing range setting in the normal photograph mode displayed in step U3 of FIG. 10, the control unit 22 encourages the operator to perform the confirmation operation by displaying the message for encouraging confirmation (for example, "Confirm setting range. When the setting range is OK, press set key. When the setting range is set again, press cursor key 5.") (step U4-7). When the operator presses the set key 6 (YES in step U4-8), the flow goes to step U4-9. When the operator does not press the set key 6, the flow returns to step U3.

In step U4-9, the control unit 22 sets (stores) the near end setting value held in step U4-2 or step U4-3 and the far end setting value held in step U4-5 or step U4-6 in the focusing range setting area reserved in the predetermined area of RAM, the control unit 22 clears the liquid crystal monitor screen 4, and the flow goes to step U5.

Thus, in the digital camera 1, since the operator can arbitrarily specify the plural focusing ranges according to the zoom stages through the operation shown in the flowcharts of FIGS. 10 and 11, the image in focus can be taken in the focusing range set by the operator while the focusing range is adopted to the zoom stage according to the change in zoom value.

In the third embodiment, although the number of zoom stages is set at seven, the number of zoom stages is not limited to seven. Further, it is possible to set the focusing range at the last stage to zero. This means that the auto focus operation is not performed at the last stage. If the number of zoom stages is seven, the auto focus range of the seventh stage may be set to zero and the auto focus ranges of the fourth stage to the seventh stage may be gradually decreased to zero.

In the above embodiments, as shown in FIGS. 3A and 3B, FIGS. 4A and 4B, FIGS. 7A to 7D, and FIG. 9, the numeric characters indicating distances such as 6 cm, 50 cm, 1 m, 2 m, 5 m, 10 m, and ∞ are displayed on the number line 43, 83, and 93 in the focusing range setting screens 41, 81, and 91. Alternatively, not the numerical value indicating the distance, but information in which the distance is associated with the icon such as a flower, human, and a mountain for symbolizing the distance is stored (recorded) in the program memory or the storage memory 28, means (for example, cursor key 5 and set key 6) for selecting the icon is provided to display the icon in the focusing range setting screen, and the focusing range may be set based on the selected icon.

In the above embodiments, when the operator sets the focusing range, the setting unit in the setting screen displayed on the liquid crystal monitor screen 4 is used as the distance (6 cm to ∞). The distance may be changed to the lens position (for example, step 1 to step 100) to directly set the lens movement range.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. In the above embodiments, the digital camera is described as an example of the image pickup apparatus. The term of image pickup apparatus can also be applied to a portable telephone equipped with camera and an information device having the image pickup unit.

What is claimed is:

1. An image pickup apparatus comprising:
    a setting unit which arbitrarily sets different auto focus search ranges;
    a selection unit which selects a desired auto focus search range from said different auto focus search ranges arbitrarily set by the setting unit; and
    an auto focus control unit which performs an auto focus operation based on the desired auto focus search range selected by the selection unit;
    wherein the setting unit comprises:
        a display unit which displays a focusing range setting screen for setting each of the different auto focus search ranges; and
        an input unit which inputs, based on a manual operation, a near end and a far end of each of the different auto focus search ranges in the focusing range setting screen displayed by the display unit.

2. An image pickup apparatus according to claim 1, wherein the display unit displays a focusing region indicating different distances to an object ranging from a close distance to infinity; and
    wherein the setting unit further comprises:
        an auto focus search range specifying unit which specifies a lower limit and an upper limit of an auto focus search range to be set on the focusing region; and
        an auto focus search range setting unit which sets a range between the lower limit and the upper limit which are specified by the auto focus search range specifying unit as the auto focus search range.

3. An image pickup apparatus according to claim 2, wherein the focusing region display unit displays the different distances on a line.

4. An image pickup apparatus according to claim 2, wherein:
    the focusing region display unit displays different icons symbolizing the different distances to the object, and
    the auto focus search range specifying unit specifies the lower limit and the upper limit of the auto focus search range by selecting an icon from the different icons displayed by the focusing region display unit.

5. An image pickup apparatus according to claim 1, further comprising a storage unit which stores the different auto focus search ranges set by the setting unit,
    wherein the selection unit selects the desired auto focus search range from the different auto focus search ranges stored in the storage unit, and
    wherein the auto focus control unit performs the auto focus operation based on the desired auto focus search range which is stored in the storage unit and is selected by the selection unit.

6. An image pickup apparatus according to claim 1, further comprising:
    a shutter button which performs a half-press operation and a full-press operation; and
    a first determination unit which determines whether the shutter button is half-pressed, and
    wherein the auto focus control unit performs the auto focus operation based on the auto focus search range selected by the selection unit, when the first determination unit determines that the shutter button is half-pressed.

7. An image pickup apparatus according to claim 6, further comprising:
    an image pickup unit which captures an image of an object to output image data;
    a second determination unit which determines whether the shutter button is full-pressed; and a recording control unit which records the image data output from the image pickup unit in a recording unit, when the second determination unit determines that the shutter button is full-pressed.

8. An image pickup apparatus according to claim 1, wherein the setting unit sets the different auto focus search ranges in different photograph modes, and wherein the selection unit includes a photograph mode selection unit which selects a desired photograph mode from said different photograph modes, and the selection unit selects the desired auto focus search range corresponding to the desired photograph mode selected by the photograph mode selection unit from the different auto focus search ranges set by the setting unit.

9. An image pickup apparatus according to claim 8, wherein the different photograph modes include a macro photograph mode.

10. An image pickup apparatus according to claim 8, wherein the different photograph modes include a normal photograph mode.

11. An image pickup apparatus according to claim 1, further comprising a focus lens, wherein the auto focus control unit moves the focus lens within a movement range corresponding to the desired auto focus search range selected by the selection unit.

12. An image pickup apparatus according to claim 1, further comprising a zoom lens, wherein the setting unit sets an arbitrary auto focus search range in each of different zoom stages, and wherein the selection unit includes a zoom value obtaining unit which obtains a zoom value, and the selection unit selects the auto focus search range of a zoom stage that corresponds to the zoom value obtained by the zoom value obtaining unit, among said auto focus search ranges set in the zoom stages by the setting unit.

13. An image pickup apparatus according to claim 12, wherein the setting unit limits a settable auto focus search range in each of the zoom stages.

14. An image pickup apparatus according to claim 12, wherein the setting unit is able to set the auto focus search range to zero.

15. An image pickup apparatus according to claim 1, wherein the setting unit is able to set a standard auto focus search range.

16. An image pickup method for an image pickup apparatus, the method comprising:

arbitrarily setting different auto focus search ranges by displaying a focusing range setting screen for setting each of the different auto focus search ranges, and inputting, based on a manual operation, a near end and a far end of each of the different auto focus search ranges in the displayed focusing range setting screen;

selecting a desired auto focus search range from said arbitrarily set different auto focus search ranges; and performing an auto focus operation based on the selected auto focus search range.

17. A computer readable storage medium having stored thereon a program for controlling an image pickup apparatus, said program controlling the image pickup apparatus to perform functions comprising:

arbitrarily setting different auto focus search ranges by displaying a focusing range setting screen for setting each of the different auto focus search ranges, and inputting, based on a manual operation, a near end and a far end of each of the different auto focus search ranges in the displayed focusing range setting screen;

selecting a desired auto focus search range from said arbitrarily set different auto focus search ranges; and performing an auto focus operation based on the selected auto focus search range.

18. An image pickup apparatus comprising:

setting means for arbitrarily setting different auto focus search ranges;

selection means for selecting a desired auto focus search range from said different auto focus search ranges arbitrarily set by the setting means; and control means for performing an auto focus operation based on the desired auto focus search range selected by the selection means, wherein the setting means comprises:

display means for displaying a focusing range setting screen to set each of the different auto focus search ranges; and input means for inputting, based on a manual operation, a near end and a far end of each of the different auto focus search ranges in the focusing range setting screen displayed by the display means.

* * * * *